United States Patent Office 2,720,219
Patented Oct. 11, 1955

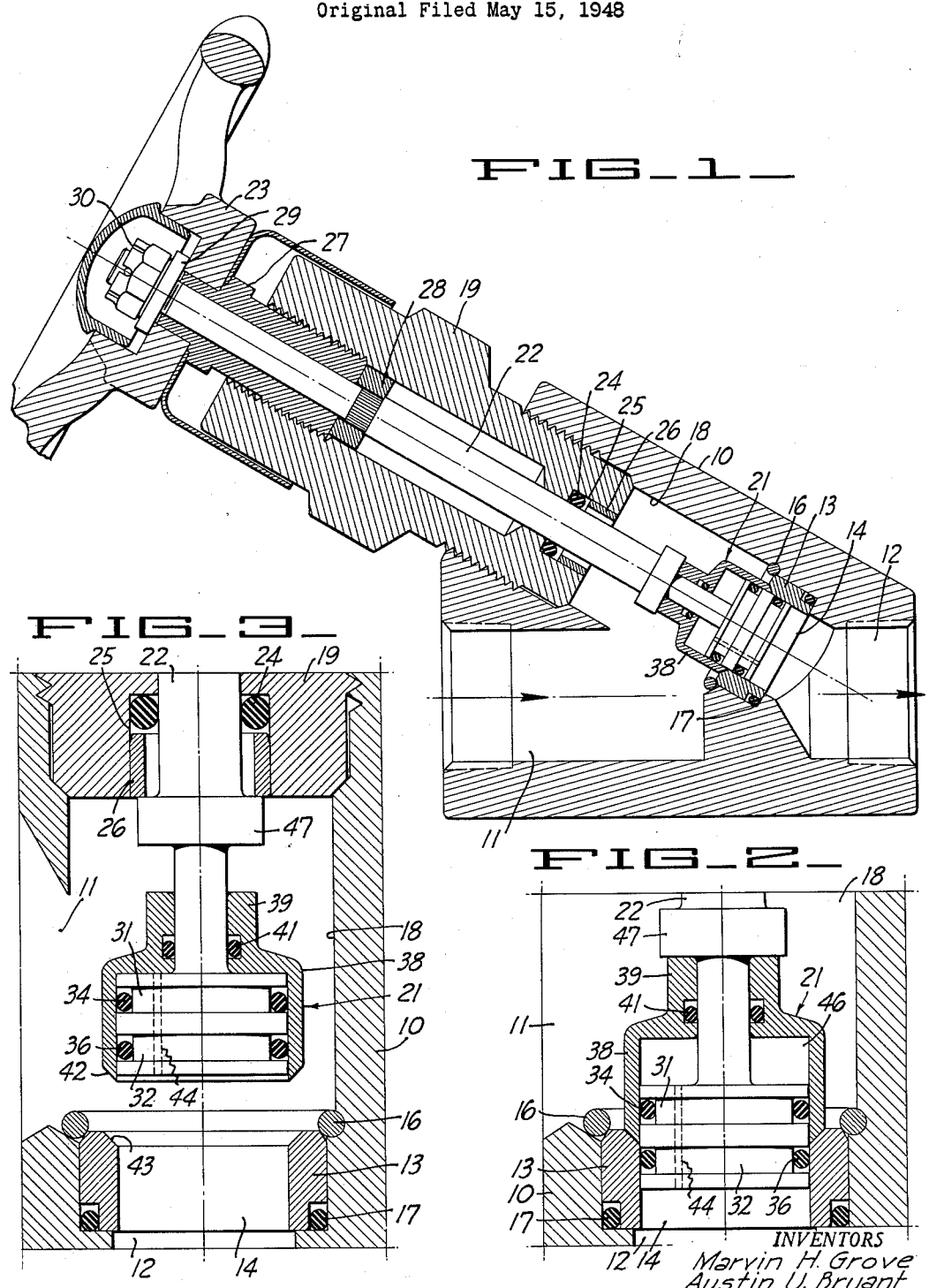

2,720,219

VALVE CONSTRUCTION

Marvin H. Grove, Piedmont, and Austin U. Bryant, Berkeley, Calif., assignors, by mesne assignments, to Grove Valve and Regulator Company, Oakland, Calif., a corporation of California Original application May 15, 1948, Serial No. 27,308. Divided and this application October 9, 1951, Serial No. 250,417

4 Claims. (Cl. 137—630.19)

This invention relates generally to valves of the type utilizing a valve member movable between open and closed positions for controlling flow of fluid.

Conventional globe and similar types of flow control valves employ a valve member adapted to be moved in opposite directions between open and closed positions with respect to a stationary annular valve seat. Metal to metal valve working surfaces are commonly employed, although one or both of the valve parts, as for example the stationary seat, may be made of or faced with nonmetallic materials such as resilient rubber. It is characteristic of such valves that a substantial amount of force must be exerted between the valve member and its cooperating seat, to maintain a substantially sealed relationship. This tends to cause deterioration of the valve working surfaces, particularly when excessive forces are employed, as is common in the manual operation of such valves. Also with such valves it is difficult to maintain a bubble tight seal. This is particularly true where metal to metal surfaces are employed.

In our copending application Serial No. 27,308, filed May 15, 1948, Patent 2,666,614 of which this application is a division, there is disclosed a valve making use of sealing means of the resilient O ring type, which is arranged to establish a bubble tight seal between the stationary seat and the movable valve member, for closed position of the valve. Such a valve has the property of establishing a bubble tight seal without application of excessive closing force. As set forth in said copending application, such a valve involves the problem of preventing dislodgment of the resilient O ring by fluid flow, particularly when the valve is used on fluid systems involving relatively high pressures.

It is an object of the present invention to provide an improved valve making use of sealing means of the O ring type, and which will prevent dislodgment of the resilient O ring or rings employed.

Another object of the invention is to provide an improved valve of the above character having novel guard means which moves automatically between seal ring protecting and out-of-the-way positions, in response to movement of the valve member between full open and closed positions.

Another object of the invention is to provide a valve having both bubble tight sealing means and supplemental valve sealing surfaces.

Additional objects of the invention will appear from the following description in which the preferred embodiment has been set forth in detail in conjunction with the accompanying drawing.

Referring to the drawing:

Figure 1 is a side elevational view in section illustrating a valve incorporating the present invention.

Figure 2 is an enlarged cross-sectional detail illustrating the working parts of the valve of Figure 1, and with the parts positioned for closed position.

Figure 3 is a cross-sectional detail like Figure 2, but with the parts in open valve position.

The valve illustrated in Figure 1 is of the manually operated type, and consists of a body 10 having inflow and outflow passages 11 and 12, which are adapted to be connected to associated piping. An annular seat member or ring 13, made of suitable metal, is disposed within the body, and forms an annular throat orifice 14 which connects the passages 11 and 12 for open position of the valve. In order to seal the ring 13 with respect to the body, it can be held in position by soldering, brazing or welding, or as illustrated, it may be retained in place by the metal snap-in ring 16, and sealed with respect to the body by the resilient O ring 17. If desired, a seat member can be formed as an integral part of the valve body.

The bore 18, which extends in alignment with the seat ring 13, is shown fitted with a suitable bonnet 19. The movable valve member 21 is attached to one end of the operating stem 22, and this stem extends through the bonnet 19 for operating engagement with the hand wheel 23. Suitable means is provided for forming a seal between the stem 22 and the bonnet 19, such as the resilient O ring 24, which is disposed in the annular recess 25, and held in place by the retainer ring 26.

As a part of the valve operating means, a bushing 27 is journaled upon the stem 22 and is threaded in the bonnet 19. The outer end of this bushing has a driving connection with the hand wheel 23. The inner end of bushing 27 engages a collar 28 which is fixed to stem 22, and the outer end of the bushing may abut a thrust washer 29, which is retained upon rod 22 by the nut 30. Thus upon turning the hand wheel 23 the valve stem 22 is moved in opposite directions to move the valve member 21 between open and closed positions. It will be evident that other types of operating means can be employed, such as pneumatic or hydraulic pressure operated diaphragms or pistons.

The construction of the valve member 21 and its associated parts can best be understood by reference to Figures 2 and 3. The valve member 21 has a cylindrical periphery which is dimensioned to be slightly smaller in diameter than the internal diameter of the metal valve seat 13. It is rigidly attached to the valve stem 22 in alignment with the seat. Upper and lower annular grooves 31 and 32 are formed in the valve member 21 and serve to loosely accommodate the resilient seal rings 34 and 36. These rings are formed of resilient material such as synthetic rubber or a like suitable "elastomer," and can be of the O ring type. Normally the cross-sectional contour of these rings is circular.

The valve member 21 is also associated with a movable guard 38, which can be formed of metal or other suitable material, and which is annular in cross-sectional contour. This shell has a cylindrical internal diameter only slightly greater than the diameter of the valve member 21, and substantially the same diameter as the internal diameter of the seat ring 13. Guard 38 has a portion 39 of reduced diameter which slidably engages the valve stem 22. A seal is established between the guard and the stem 22, by suitable means such as the resilient O ring 41.

The lower end of the guard is adapted to engage the upper face of the metal seat ring 13. Thus the lower end face 42 of the guard is shown beveled conically to engage the conical face 43 of the metal seat ring 13. A vent passage 44 extends through the valve member 21 in order to establish communication between the closed space 46 above the valve member, and the space or valve passage below the valve member.

Closed position of the parts is illustrated in Figure 2. For this operating position a collar 47 on the valve stem 22 is shown engaging the portion 39 of the guard, and the beveled faces 42 and 43 are being forced together. The resilient seal rings 34 and 36 seal about areas surrounding the valve member at levels above and below the conical surfaces 42 and 43. The dimensioning of the grooves 31 and 32 and the internal diameter of the seat ring 13 and guard 38 is such that normally the resilient O rings are compressed a small amount in a radial direction.

Assuming application of fluid pressure from above the valve member, such pressure is applied to the guard 38 to urge the same downwardly, but fluid cannot leak past the valve member because of the seal established by the resilient seal rings 34 and 36. When the movable valve assembly is moved toward open position guard 38 is initially held by pressure against the metal seat 13 until the valve member is completely retracted within the guard 38. During this transfer there is no opportunity for the seal rings to be dislodged. Thereafter the guard moves in unison with the valve member to the full open position shown in Figure 3.

It will be evident that the valve described above has certain desirable characteristics. As the valve assembly is moved toward closed position, there is initially a decrease in the effective cross-sectional flow area between the conical seating surfaces 42 and 43, whereby the flow rate is effectively reduced. When the conical surfaces 42 and 43 come into physical contact, an approximate seal is established, which reduces the flow to a relatively low value. Thereafter further downward movement of the stem 22 carries the resilient O ring 36 past the line of contact between the conical surfaces 42 and 43, and into the seat ring 13. A bubble tight seal is now established, and fluid pressure acts upon the O rings 34 and 36 to urge the same in opposite directions. By virtue of the difference in diameter between the stem and the inner periphery of the guard 38, differential fluid force acts upon the guard to urge the same against the seat during final closing and sealing, and during the initial opening movement. Thus the force of fluid pressure is utilized in place of a mechanical spring, such as a spring of the type illustrated in certain of the embodiments disclosed in my aforementioned patent 2,666,614. The resilient O ring 41, in forming a seal between the stem and the guard portion 39, prevents flow of fluid between these parts for all operating positions.

Our valve can be used to advantage in many industrial applications and is applicable to relatively high fluid pressures, such as pressures of the order of 2000 p. s. i. or more.

We claim:

1. In a fluid flow control valve, a valve body having flow passages, an annular seat formed within the body and providing a cylindrical throat orifice connecting said passages, a cylindrical shaped valve member movable between open and closed positions relative to the body and dimensioned to snugly fit within the throat orifice for closed position of the valve, an annular groove formed in the periphery of the valve member, a resilient O ring disposed within said groove, the groove being dimensioned whereby when the valve member is positioned within the throat orifice the O ring is compressed radially to form a fluid tight seal, the distance between the end faces of said groove being substantially greater than the thickness of the associated O ring, an annular guard disposed completely within the body, said guard being carried by the valve member and movable axially relative thereto between two operating positions, said guard in one operating position generally embracing and serving to protect said O ring and in the other being in nonembracing relation to the O ring to thereby permit the O ring to form a seal between the valve member and the seat member, said guard having an annular end surface faced toward the seat, said end surface being brought into abutting engagement with the seat to form a secondary seal when the valve member is moved to closed position, said O ring being capable of limited movement in an axial direction relative to the valve member under the urge of fluid pressure applied to the same, when the valve member is being moved from open to closed operating positions.

2. A valve as in claim 1 together with additional means forming a fluid tight seal between the valve member and said annular guard for all operating positions of the latter, said additional means being on that side of the O ring which is remote from that end of the valve member which faces the valve orifice.

3. A valve as in claim 2 together with means for yieldably urging the guard relative to the valve member and toward said resilient O ring.

4. A fluid flow control valve comprising a valve body having inlet and outlet passages, a stationary seat member formed within the valve body, and providing a cylindrical orifice connecting the inlet and outlet passages, one end of the seat member being provided with a conical shaped valve working surface, a valve stem extending into the body in alignment with the axis of the seat ring and movable axially for opening and closing the valve, a valve member mounted upon the inner end of said stem and having a cylindrical portion slightly less in diameter than said orifice, said valve member being movable into interfitting relation with said seat member for closed position of the valve, an annular guard member slidably carried by the valve member upon the inlet side of the seat member, said guard member being annular in cross-sectional contour, means serving to establish a seal between said guard and valve members, one end face of the guard member having a conical valve working surface adapted to engage and to form an approximate fluid tight seal with respect to the conical surface of the seat member, said guard member having an inner periphery of substantially the same diameter as the cylindrical orifice, an annular groove formed in the periphery of the valve member, a resilient O ring disposed in said groove and adapted to be radially compressed when embraced by either the seat ring or said guard, said groove being positioned whereby for closed position of the valve member, said resilient O ring is embraced by and is in sealed engagement with the seat member, the width of the groove as measured in a direction axially of the valve member being greater than the thickness of the O ring whereby the O ring is free to move axially of the valve member a limited amount, and means serving to urge said guard member toward said seat member, said annular groove being likewise located whereby upon retraction of the valve member from the seat member to open the valve, said resilient O ring is transferred into said guard and thereafter the guard retracted from approximate sealing engagement with the seat ring.

References Cited in the file of this patent

UNITED STATES PATENTS

| | | |
|---|---|---|
| 382,469 | Hawthorn | May 8, 1888 |
| 1,047,774 | Eynon | Dec. 17, 1912 |
| 1,293,858 | Mills | Feb. 11, 1919 |
| 1,385,019 | Mathieu | July 19, 1921 |
| 2,408,000 | Schiller | Sept. 24, 1946 |
| 2,431,437 | Van Der Werff | Nov. 25, 1947 |
| 2,583,539 | Bashark | Jan. 29, 1952 |

FOREIGN PATENTS

| | | |
|---|---|---|
| 693,355 | France | 1930 |